United States Patent
Farley et al.

(10) Patent No.: US 10,356,981 B2
(45) Date of Patent: Jul. 23, 2019

(54) AGRICULTURAL HEADER WITH CONSTANT REEL TO CUTTER RELATIONSHIP

(71) Applicant: CNH Industrial America LLC, New Holland, PA (US)

(72) Inventors: Herbert M. Farley, Elizabethtown, PA (US); Benjamin D. Kemmerer, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 120 days.

(21) Appl. No.: 15/705,692

(22) Filed: Sep. 15, 2017

(65) Prior Publication Data

US 2019/0082603 A1    Mar. 21, 2019

(51) Int. Cl.
| | |
|---|---|
| A01D 61/00 | (2006.01) |
| A01D 34/04 | (2006.01) |
| A01D 61/02 | (2006.01) |
| A01D 41/14 | (2006.01) |

(52) U.S. Cl.
CPC ............ *A01D 61/008* (2013.01); *A01D 34/04* (2013.01); *A01D 61/02* (2013.01); *A01D 41/14* (2013.01); *A01D 61/004* (2013.01)

(58) Field of Classification Search
CPC ...... A01D 61/008; A01D 61/02; A01D 34/04; A01D 41/14; A01D 61/004; A01D 57/04; A01D 57/02
See application file for complete search history.

(56) References Cited

U.S. PATENT DOCUMENTS

| | | | |
|---|---|---|---|
| 882,969 A | 3/1908 | Rump | |
| 1,729,868 A | 10/1929 | Eichelberger | |
| 2,070,083 A | 2/1937 | Hume et al. | |
| 2,077,018 A | 4/1937 | Schewe | |
| 3,208,208 A | 9/1965 | Schatz | |
| 3,345,808 A * | 10/1967 | Van Der Lely | A01D 34/246 56/10.2 R |
| 4,124,970 A | 11/1978 | Bernhardt | |

(Continued)

FOREIGN PATENT DOCUMENTS

| | | |
|---|---|---|
| DE | 102011116341 A1 | 3/2013 |
| WO | 02/102138 A1 | 12/2002 |

OTHER PUBLICATIONS

International Search Report and Written Opinion for PCT/US2018/051030 dated Jan. 15, 2019 (11 pages).

*Primary Examiner* — Arpad Fabian-Kovacs
(74) *Attorney, Agent, or Firm* — Peter K. Zacharias; Patrick M. Sheldrake

(57) ABSTRACT

A header for an agricultural vehicle includes: a header frame; a flexible cutter supported by the header frame and including a plurality of cutting edges; a reel including a plurality of reel sections movably supported by the header frame, each of the reel sections including a plurality of tines and being independently movable from the other reel sections; and at least one rigid link connecting the flexible cutter to one of the reel sections, the at least one rigid link being configured to transmit flexing forces acting on the flexible cutter to the connected one reel section such that a substantially constant separation is maintained between the flexible cutter and the connected one reel section.

20 Claims, 3 Drawing Sheets

(56) References Cited

U.S. PATENT DOCUMENTS

| | | | | |
|---|---|---|---|---|
| 4,204,383 | A | * | 5/1980 | Milliken, Jr. ........ A01D 41/141 56/10.2 E |
| 4,487,004 | A | | 12/1984 | Kejr |
| 4,507,910 | A | | 4/1985 | Thornley et al. |
| 4,565,056 | A | * | 1/1986 | Heidjann ............. A01D 41/141 56/14.4 |
| 4,715,172 | A | * | 12/1987 | Mosby ................ A01D 41/144 172/311 |
| 4,800,711 | A | * | 1/1989 | Hurlburt ............... A01D 41/14 56/10.2 R |
| 4,907,400 | A | * | 3/1990 | Roden ................... A01D 57/02 56/10.4 |
| 5,904,032 | A | * | 5/1999 | Rippel .................. A01D 41/04 460/119 |
| 6,029,429 | A | * | 2/2000 | Fox ....................... A01D 41/14 56/10.2 E |
| 6,442,918 | B1 | * | 9/2002 | Fox ....................... A01D 57/03 56/220 |
| 8,176,716 | B2 | * | 5/2012 | Coers ................... A01D 57/02 56/364 |
| 9,763,385 | B2 | * | 9/2017 | Digman ............... A01D 41/141 |
| 2009/0107094 | A1 | | 4/2009 | Bich et al. |
| 2010/0011728 | A1 | * | 1/2010 | Pietricola ............. A01D 41/148 56/14.4 |
| 2010/0293914 | A1 | * | 11/2010 | Killen ................... A01D 57/04 56/128 |
| 2012/0304611 | A1 | * | 12/2012 | Rayfield ............... A01D 75/18 56/226 |

\* cited by examiner

AGRICULTURAL HEADER WITH CONSTANT REEL TO CUTTER RELATIONSHIP

FIELD OF THE INVENTION

The present invention pertains to an agricultural vehicle and, more specifically, to a header for an agricultural vehicle which includes both a reel and a cutter.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

To remove crop material from the field, the header of the combine harvester may be equipped with a cutter, such as a cutter bar assembly, having many sharp cutting elements that reciprocate sidewardly, relative to a forward direction of travel, to sever the crop material from the field before entering the feeder housing. The header may also include a rotating reel with tines or the like to sweep crop material toward the cutting elements.

To better follow the ground during harvesting, many headers include a flexible cutter bar assembly which can flex during travel of the vehicle to more closely follow the contour of the ground when, for example, the vehicle encounters uneven terrain. To flex, the cutter bar assembly may include one or more flexible segments which carry the cutting elements and are connected to arms which can move up and down responsively to forces from the ground, which causes flexing of the flexible segments and vertical movement of the carried cutting elements.

One particular problem encountered by headers including flexible cutter bar assemblies arises due to the movable nature of the cutting elements in relation to the tines of the reel. In many configurations, the cutting elements have the ability to flex a significant distance, such as 3 inches, vertically toward the reel tines; the top position where the cutter bar is able to flex can be referred to as the top of the "flex range" of the cutter bar. To avoid the tines being clipped off by the cutting elements when the cutter bar reaches the top of the flex range, the tines must be kept, at least, above the top of the flex range. In order to keep the tines above the top of the flex range so the tines do not get clipped off by the reel during maximum flexure, the reel may be positioned so that the lowest position of the tines is above the top of the flex range as the vehicle is harvesting. In such a configuration, reel performance may be poor due to the distance between the tines and the cutting elements being too large to efficiently move crops toward the cutting elements when the cutter bar is at its normal operating position, e.g., 3 inches below the top of the flex range. To improve reel performance, some headers are equipped with reels that can move up and down responsively to flexure of the cutter bar. One particular problem with such known configurations is that there can be a delay between the cutter bar flexing and the reel moving, which risks some of the tines being clipped off by the cutting elements, and the constructions may be complex.

What is needed in the art is a header which can overcome some of the previously described disadvantages of known headers.

SUMMARY OF THE INVENTION

In one exemplary embodiment formed in accordance with the present invention, there is provided a rigid link which connects to one reel section of a multi-section reel and a flexible cutter so flexing forces acting on the flexible cutter transmit to the connected reel section such that a substantially constant separation is maintained between the flexible cutter and connected reel section.

In another exemplary embodiment formed in accordance with the present invention, there is provided a header for an agricultural vehicle including: a header frame; a flexible cutter supported by the header frame and including a plurality of cutting edges; a reel including a plurality of reel sections movably supported by the header frame, each of the reel sections including a plurality of tines and being independently movable from the other reel sections; and at least one rigid link connecting the flexible cutter to one of the reel sections, the at least one rigid link being configured to transmit flexing forces acting on the flexible cutter to the connected one reel section such that a substantially constant separation is maintained between the flexible cutter and the connected one reel section.

In yet another exemplary embodiment formed in accordance with the present invention, there is provided an agricultural vehicle including a chassis and a header carried by the chassis. The header includes: a header frame; a flexible cutter supported by the header frame and including a plurality of cutting edges; a reel including a plurality of reel sections movably supported by the header frame, each of the reel sections including a plurality of tines and being independently movable from the other reel sections; and at least one rigid link connecting the flexible cutter to one of the reel sections, the at least one rigid link being configured to transmit flexing forces acting on the flexible cutter to the connected one reel section such that a substantially constant separation is maintained between the flexible cutter and the connected one reel section.

One possible advantage of exemplary embodiments provided in accordance with the present invention is the rigid link can maintain a substantially constant separation between the flexible cutter and the connected one reel section reactively to flexing forces acting on the flexible cutter with little, if any, delay.

Another possible advantage of exemplary embodiments provided in accordance with the present invention is maintaining the substantially constant separation can improve feeding and the ability to pick up lodged crop.

Yet another possible advantage of exemplary embodiments provided in accordance with the present invention is only the reel section adjacent to a portion of the flexible cutter which is flexing may move responsively to the flexing, rather than an entirety of the reel.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
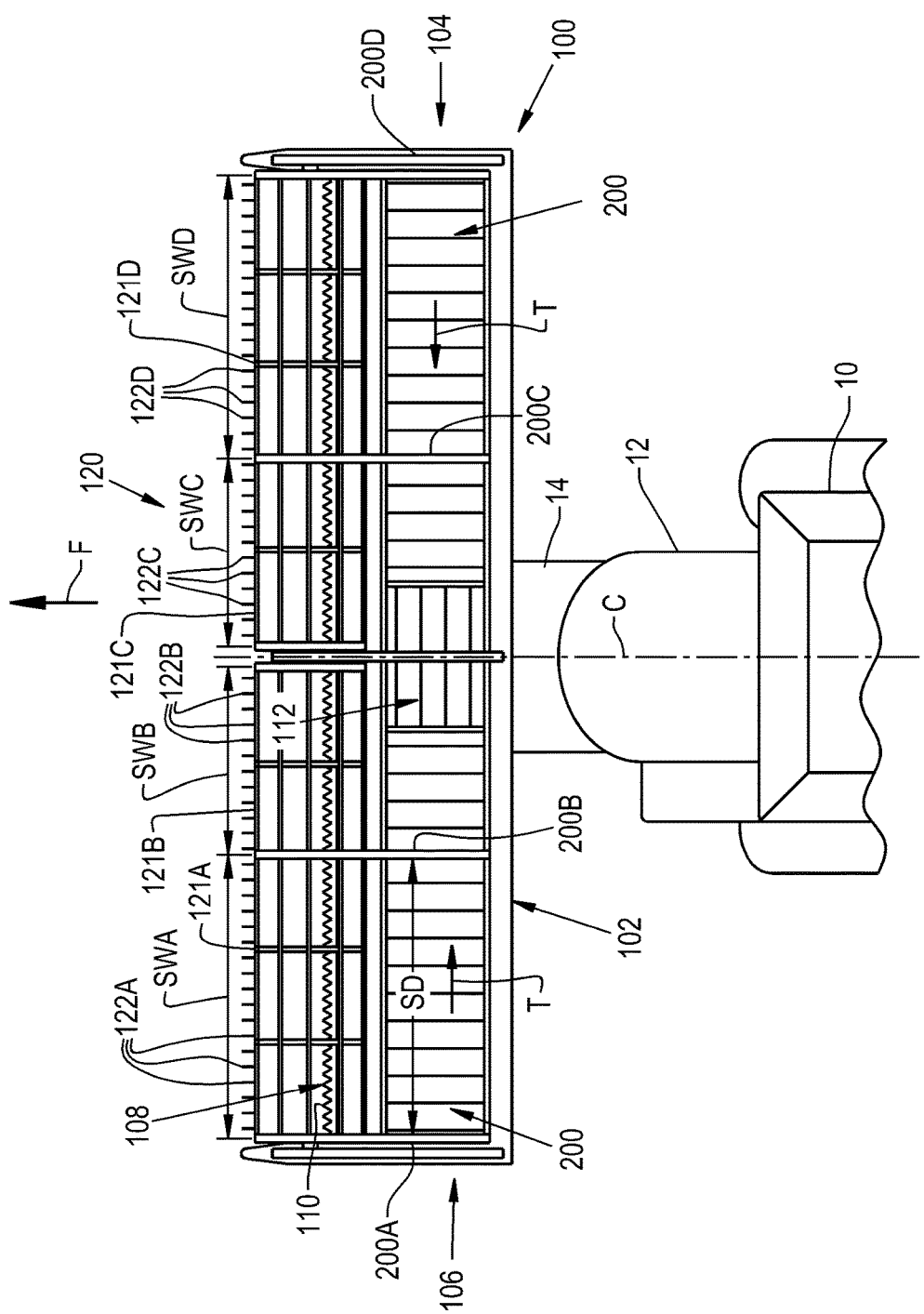
FIG. 1 illustrates a top view of an exemplary embodiment of an agricultural vehicle, the agricultural vehicle comprising a chassis and a header, in accordance with an exemplary embodiment of the present invention.

Referring now to the drawings, and more particularly to FIG. 1, there is shown an exemplary embodiment of an agricultural vehicle 10 in the form of a combine harvester which generally includes a chassis 12, a feeder housing 14, and an attachment in the form of a header 100. Typically, the combine harvester 10 will include additional internal systems for the separation and handling of collected crop material, but these additional systems are omitted from view for brevity of description. It should be appreciated that the header 100 described and illustrated herein does not necessarily need to be included on combine harvesters, but can be incorporated in other agricultural vehicles such as windrowers. Further, while the exemplary embodiment of the header 100 is shown and described as a draper header, it should be appreciated that the header can be formed, in some exemplary embodiments, as an auger-type header incorporating one or more augers as the crop material conveyor(s).

The header 100 is coupled to the feeder housing 14 and supported by the chassis 12 of the agricultural vehicle 10. The header 100 has a header frame 102 and a pair of opposed lateral ends 104, 106. The header frame 102 supports one or more flexible cutters 108, shown as a cutter bar, with reciprocating cutting edges 110 to cut crop material as the agricultural vehicle 10 travels in a forward direction, denoted by arrow F. The header 100 may further include a center feed belt 112 or a center auger that conveys the crop material into the feeder housing 14. In one exemplary embodiment, the header 100 can include one or more lateral, flexible draper belts 140 that are positioned rearwardly of the cutter bar(s) 108 and travel, i.e. rotate, in opposing directions of travel, denoted by each arrow "T", in order to convey the crop material inwardly to the center feed belt 112 and thereby the feeder housing 14. In some exemplary embodiments, the header 100 may include a pair of counter-rotating cross augers, rather than the draper belts 140, to convey crop material laterally inward toward the center feed belt 112.

The header 100 includes a rotating reel 120 with a plurality of reel sections 121A, 121B, 121C, 121D which are each movably supported by the header frame 102 and include corresponding tines 122A, 122B, 122C, 122D or the like to sweep crop material inwardly toward the flexible cutter(s) 108 for cutting as the reel sections 121A, 121B, 121C, 121D rotate. As shown, the reel 120 includes four independently movable reel sections 121A, 121B, 121C, and 121D, with two reel sections on each side of a center line C extending through the header 100, but it should be appreciated that the reel 120 may include any number of desired reel sections so long as the number of reel sections is greater than one. Each reel section 121A, 121B, 121C, 121D defines a respective reel section width SWA, SWB, SWC, SWD, the significance of which will be described further herein. One or more of the reel section widths SWA, SWB, SWC, SWD may be different from the others, as shown, or the widths may all be equal if desired. In some exemplary embodiments, the reel section 121A may be connected to the reel section 121B and the reel section 121C may be connected to the reel section 121D, with the reel section 121A being flexibly movable relative to the reel section 121B and the reel section 121C being flexibly movable relative to the reel section 121D so the reel sections 121A, 121B, 121C, 121D can move independently from one another.

Figure 2:
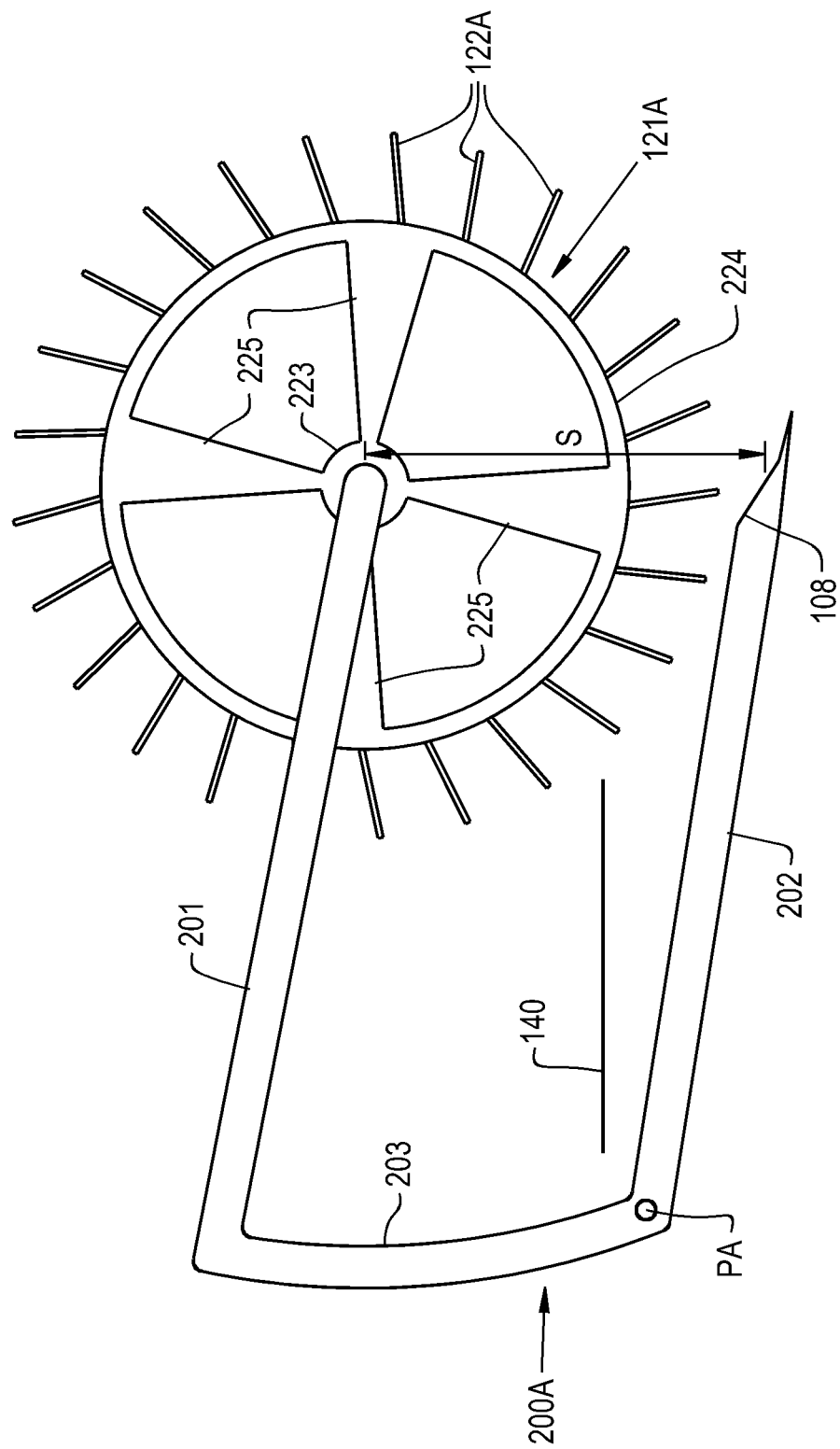
FIG. 2 illustrates a rigid link and a single reel section of the header of FIG. 1 when a cutter of the header is in a normal, unflexed state, in accordance with an exemplary embodiment of the present invention.

With further reference to FIG. 1, and referring now to FIG. 2 as well, the header 100 includes one or more rigid links 200A, 200B, 200C, 200D connecting the flexible cutter 108 to a respective one of the reel sections 121A, 121B, 121C, 121D. As used herein, the links 200A, 200B, 200C, 200D are "rigid" in the sense that forces acting on the links 200A, 200B, 200C, 200D will tend to be transmitted through the links 200A, 200B, 200C, 200D to the connected components, such as one of the reel sections 121A and the flexible cutter 108 as shown in FIG. 2, rather than the acting forces tending to deform the material of the link 200A. In this sense, each link 200A, 200B, 200C, 200D can be formed as a unitary body from a relatively rigid material, such as steel or other metals, which resists bending when subjected to forces that may be encountered during harvesting; the rigid links 200A, 200B, 200C, 200D may be formed, for example, by casting steel into the desired shape. The significance of the rigidity of the links 200A, 200B, 200C, 200D is described further herein.

Referring specifically now to FIG. 2, an exemplary embodiment of one of the rigid links 200A is shown connecting the reel section 121A to the flexible cutter 108; it should be appreciated that, in one exemplary embodiment, the other rigid links 200B, 200C, 200D can be formed similarly to the rigid link 200A according to the present invention. As can be seen, the rigid link 200A can include a reel arm portion 201 which connects to the one reel section 121A and a cutter arm portion 202 which connects to the flexible cutter 108; while both the reel arm portion 201 and cutter arm portion 202 are shown as having a substantially straight shape, one or both of the respective portions 201, 202 may also be curved, if desired. The reel arm portion 201 and the cutter arm portion 202 can be connected to one another by a connecting portion 203 which, as shown, may have a curved shape; in one exemplary embodiment, the connecting portion 203 may curve rearwardly from the cutter arm portion 202 to the reel arm portion 201. The reel arm portion 201 may connect, for example, to a hub 223 of the reel section 121A which is connected to a rim 224 of the reel section 121A by a plurality of spokes 225, the rim 224 of the reel section 224 defining a lateral end of the reel section 121A, so movement of the reel arm portion 201 causes a corresponding movement of the reel section 121A. Similarly, the cutter arm portion 202 may connect to the flexible cutter 108, which may be a cutter bar, so flexure of the cutter bar 108 causes a corresponding movement of the reel section 121A, or vice versa.

Figure 3:
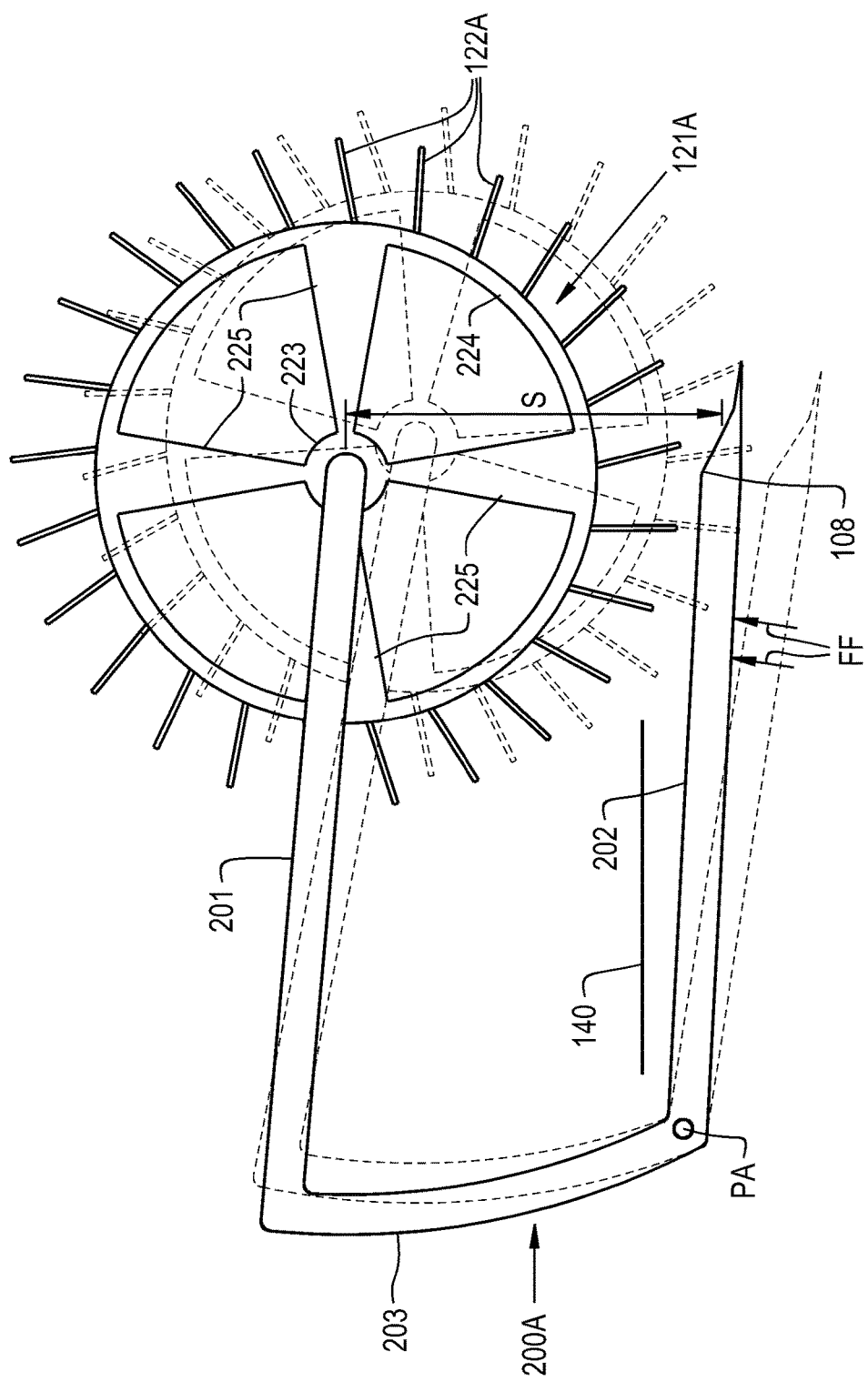
FIG. 3 illustrates a rigid link and a single reel section of the header of FIG. 2 when the cutter of the header is in a flexed state, in accordance with an exemplary embodiment of the present invention.

With further reference to FIG. 2, and now also referring to FIG. 3, the effect of the link 200A being rigid is illustrated. Since the cutter bar 108 is flexible in response to certain flexing forces acting on the cutter bar 108, which are generally vertically directed forces, the cutter bar 108 has a substantially unflexed state, shown in FIG. 2, when the cutter bar 108 does not have any significant vertical forces other than gravity acting on the cutter bar 108. As can be seen, when a flexing force, illustrated as arrow FF in FIG. 3, acts on the flexible cutter bar 108 and causes flexure of the cutter bar 108, as shown in FIG. 3, the cutter bar 108 tends to flex in the direction of the flexing force FF. If the reel section 121A were to stay in the same position (illustrated in dashed lines in FIG. 3) when the cutter bar 108 flexed, the tines 122A of the reel section 121A would be placed in reach of the cutting edges 110 and possibly clipped off the reel section 121A. Due to the rigidity of the link 200A, however, the flexing force FF acting on the flexible cutter 108 transmits to the connected reel section 121A to also cause a corresponding movement of the reel section 121A, maintaining a substantially constant separation S between the flexible cutter 108 and the connected reel section 121A. In this sense, the rigid link 200A is configured to transmit flexing forces FF acting on the flexible cutter 108 to the connected one reel section 121A such that the substantially constant separation S is maintained between the flexible cutter 108 and the connected one reel section 121A. The flexing forces FF acting on the flexible cutter 108 may originate from the rigid link 200A or, alternatively, the flexing forces FF acting on the flexible cutter 108 may originate from the ground or other source. As used herein, the separation S is "substantially constant" in the sense that the distance between the flexible cutter 108 and any part of the reel section 121A, such as the hub 223, may only change by 1-5% due to slight deformation of the material of the rigid link 200A when the flexing force FF transmits through the rigid link 200A; however, in some exemplary embodiments the separation S between the flexible cutter 108 and the reel section 121A may not appreciably change due to the link 200A being so rigid that the material does not appreciably deform as the flexing force FF transmits through the rigid link 200A. The separation S between the flexible cutter 108 and the connected reel section 121A may be controlled, for example, by a length and shape of the connecting portion 203 of the rigid link 200A and/or by the respective lengths and angling of the reel arm portion 201 and cutter arm portion 202 relative to the connecting portion 203.

Since the flexing force FF transmits through the rigid link 200A to the reel section 121A, the corresponding movement of the reel section 121A should be almost instantaneous in response to the flexing force FF acting on the flexible cutter 108, allowing the tines 122A to be quickly taken out of the area where the cutting elements 110 are and which may allow the reel section 121A to be placed close to the flexible cutter 108 to improve reel performance without significantly increasing the risk of the flexible cutter 108 clipping off any tines 122A when the flexible cutter 108 flexes due to the flexing forces FF. Connecting the rigid link 200A to both the reel section 121A and the flexible cutter 108, therefore, can allow the reel section 121A to near-instantaneously move reactively to flexing forces FF which cause flexure of the flexible cutter 108 using a relatively simple construction and protect the tines 122A during flexure of the flexible cutter 108 when the tines 122A are in the top of the flex range when the flexible cutter 108 is unflexed.

To transmit the flexing forces FF through the rigid link 200A, the rigid link 200A can be pivotably coupled to the header frame 102 so the flexing forces FF cause pivoting of the rigid link 200A, as can be seen from comparing FIGS. 2 and 3, to move the reel section 121A responsively to flexure of the flexible cutter 108. As shown in FIG. 2, the rigid link 200A can define and pivot about a pivot axis PA, which may be a pivot pin, which is located rearwardly of the draper belt 140. Having the pivot axis PA behind the draper belt 140 in combination with the curved shape of the connecting portion 203 can allow the rigid link 200A to pivot and transmit the flexing forces FF without interfering with other components of the header 100, such as the draper belt 140, since the vertical movement of the cutter arm portion 202 may be less adjacent to the pivot axis PA than adjacent to the flexible cutter 108. To allow fore, aft, up, and down movements of the reel section 121A, the rigid link 200A may be pivotably connected to, for example, a portion of the header frame 102 connected to one or more actuators (not shown) which effect fore, aft, up, and/or down movements of the reel section 121A, with fore, aft, up, and/or down movement of the connected portion of the header frame 102 and rigid link 200A causing a corresponding movement of the connected reel section 121A.

Referring again to FIG. 1, one of the links 200A (which may be referred to as a first rigid link) connecting one of the reel sections 121A (which may be referred to as a first reel section) to the flexible cutter 108 and another of the links 200B (which may be referred to as a second rigid link) connecting another of the reel sections 121B (which may be referred to as a second reel section) to the flexible cutter 108 may define a link separation distance SD therebetween which is at least equal to the reel width SWA of the first reel section 121A. Separating the adjacent links 200A, 200B by at least the link separation distance SD equal to the reel width SWA of the first reel section 121A can allow movement of each of the reel sections 121A and 121B by the rigid links 200A, 200B to be independent from each other without the rigid links 200A, 200B interfering with movement of the non-connected reel section 121B, 121A. The other rigid links 121C, 121D can be similarly separated by a distance at least equal to, for example, the reel width SWC of the reel section 121C, for similar reasons.

It should be appreciated from the foregoing that exemplary embodiments of the present invention not only provide for near-instantaneous adjustment of the reel 120 responsively to flexing forces FF acting on the flexible cutter 108, but can also allow adjustment of the reel 120 to only occur in the respective reel section 121A, 121B, 121C, 121D adjacent to where the flexing of the flexible cutter 108 occurs. Exemplary embodiments of the present invention, therefore, can provide a header 100 with a reel 120 which can be close to the flexible cutter 108 with a relatively low risk of tines 122A, 122B, 122C, 122D being clipped off by the flexible cutter 108 and with reel sections 121A, 121B, 121C, 121D which only adjust responsively to flexing forces FF transmitting through a respectively connected rigid link 200A, 200B, 200C, 200D so adjustment of the reel 120 may not occur across the entire reel 120 when only a portion of the flexible cutter 108 flexes.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A header for an agricultural vehicle, comprising:
   a header frame;
   a flexible cutter supported by said header frame and including a plurality of cutting edges;
   a reel including a plurality of reel sections movably supported by said header frame, each of said reel sections including a plurality of tines and being independently movable from the other reel sections; and
   at least one rigid link connecting said flexible cutter to one of said reel sections, said at least one rigid link being configured to transmit flexing forces acting on said flexible cutter to said connected one reel section such that a substantially constant separation is maintained between said flexible cutter and said connected one reel section.

2. The header of claim 1, wherein said at least one rigid link is pivotably coupled to said header frame.

3. The header of claim 2, further comprising a draper belt supported by said header frame rearwardly of said flexible cutter, said at least one rigid link defining a pivot axis located rearwardly of said draper belt.

4. The header of claim 1, wherein said header is configured as a draper header or an auger-type header.

5. The header of claim 1, wherein said at least one rigid link comprises a plurality of rigid links, each of said rigid links connecting said flexible cutter to a respective one of said reel sections.

6. The header of claim 5, wherein said plurality of reel sections comprises a first reel section having a first reel width and a second reel section adjacent to said first reel section, said plurality of rigid links including a first rigid link connecting said first reel section to said flexible cutter and a second rigid link connecting said second reel section to said flexible cutter, said first rigid link and said second rigid link defining a link separation distance therebetween which is at least equal to said first reel width.

7. The header of claim 1, wherein said at least one rigid link includes a reel arm portion connected to said connected one reel section and a cutter arm portion connected to said flexible cutter and said reel arm portion.

8. The header of claim 7, wherein said at least one rigid link includes a connecting portion connecting said reel arm portion to said cutter arm portion, said connecting portion having a curved shape.

9. The header of claim 8, wherein at least one of said reel arm portion and said cutter arm portion has a straight shape.

10. The header of claim 1, wherein said at least one rigid link is formed as a unitary body.

11. An agricultural vehicle, comprising:
    a chassis; and
    a header carried by said chassis, said header including:
       a header frame;
       a flexible cutter supported by said header frame and including a plurality of cutting edges;
       a reel including a plurality of reel sections movably supported by said header frame, each of said reel sections including a plurality of tines and being independently movable from the other reel sections; and
       at least one rigid link connecting said flexible cutter to one of said reel sections, said at least one rigid link being configured to transmit flexing forces acting on said flexible cutter to said connected one reel section such that a substantially constant separation is maintained between said flexible cutter and said connected one reel section.

12. The agricultural vehicle of claim 11, wherein said at least one rigid link is pivotably coupled to said header frame.

13. The agricultural vehicle of claim 12, further comprising a draper belt supported by said header frame rearwardly of said flexible cutter, said at least one rigid link defining a pivot axis located rearwardly of said draper belt.

14. The header of claim 11, wherein said header is configured as a draper header or an auger-type header.

15. The agricultural vehicle of claim 11, wherein said at least one rigid link comprises a plurality of rigid links, each of said rigid links connecting said flexible cutter to a respective one of said reel sections.

16. The agricultural vehicle of claim 15, wherein said plurality of reel sections comprises a first reel section having a first reel width and a second reel section adjacent to said first reel section, said plurality of rigid links including a first rigid link connecting said first reel section to said flexible cutter and a second rigid link connecting said second reel section to said flexible cutter, said first rigid link and said second rigid link defining a link separation distance therebetween which is at least equal to said first reel width.

17. The agricultural vehicle of claim 11, wherein said at least one rigid link includes a reel arm portion connected to said connected one reel section and a cutter arm portion connected to said flexible cutter and said reel arm portion.

18. The agricultural vehicle of claim 17, wherein said at least one rigid link includes a connecting portion connecting said reel arm portion to said cutter arm portion, said connecting portion having a curved shape.

19. The agricultural vehicle of claim 18, wherein at least one of said reel arm portion and said cutter arm portion has a straight shape.

20. The agricultural vehicle of claim 11, wherein said at least one rigid link is formed as a unitary body.

* * * * *